(12) United States Patent
Lyall, III

(10) Patent No.: US 7,021,198 B1
(45) Date of Patent: Apr. 4, 2006

(54) BREW BASKET FOR COFFEE FILTER PACK

(75) Inventor: Lucian H. Lyall, III, Coto De Caza, CA (US)

(73) Assignee: Wilbur Curtis Company, Inc., Montebello, CA (US)

( * ) Notice: Subject to any disclaimer, the term of this patent is extended or adjusted under 35 U.S.C. 154(b) by 382 days.

(21) Appl. No.: 10/272,037

(22) Filed: Oct. 15, 2002

(51) Int. Cl.
*A47J 31/00* (2006.01)
*A47J 31/10* (2006.01)

(52) U.S. Cl. .............. 99/306; 99/295; 99/304; 99/315; 426/77

(58) Field of Classification Search ............ 99/295, 99/304, 306, 315; 426/433, 77
See application file for complete search history.

(56) References Cited

U.S. PATENT DOCUMENTS

| 4,191,100 A | 3/1980 | Marotta |
| 4,303,525 A | 12/1981 | Stover |
| 4,765,896 A | 8/1988 | Hartley et al. |
| 5,231,918 A | 8/1993 | Grzywna |
| 5,287,797 A | 2/1994 | Grykiewicz et al. |
| 5,858,437 A | 1/1999 | Anson |
| 5,910,205 A | 6/1999 | Patel |
| 5,947,004 A | 9/1999 | Huang |
| 5,964,141 A | 10/1999 | Andrew et al. |
| 6,101,924 A | 8/2000 | Blankenship et al. |
| 6,164,191 A | 12/2000 | Liu et al. |
| 6,250,209 B1 | 6/2001 | Pope |
| 6,260,476 B1 | 7/2001 | Pope |
| D453,088 S | 1/2002 | Bell et al. |

*Primary Examiner*—Anthony J. Weier
(74) *Attorney, Agent, or Firm*—Fulwider Patton LLP

(57) ABSTRACT

A coffee brewing basket for use with a pre-measured coffee filter packet is shown having a first compartment for retaining the coffee filter packet and a second compartment situated below the first compartment for providing an initial wetting of the coffee filter packet. A rib protruding from an interior wall of the first compartment into the second compartment provides access by which hot water introduced into the brewing basket can enter the first compartment and bypass the coffee filter packet to collect in the lower compartment. A reservoir formed by a series of ridges channels the water draining out of the second compartment and draws water through the coffee filter.

11 Claims, 2 Drawing Sheets

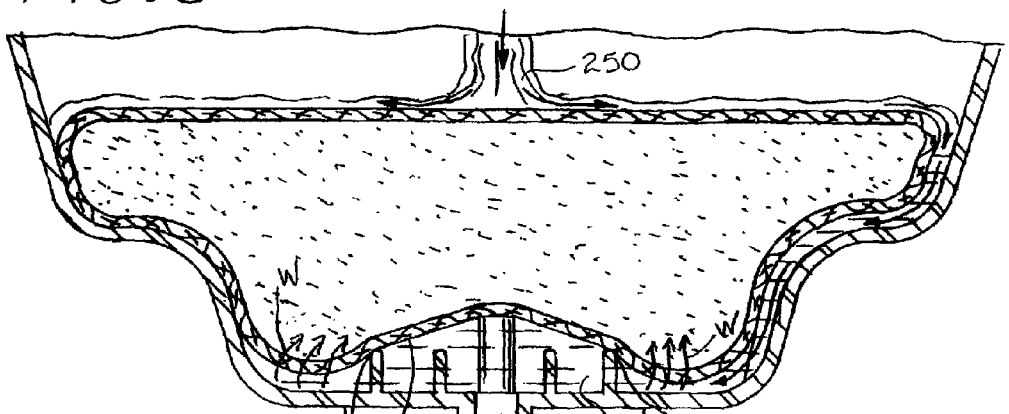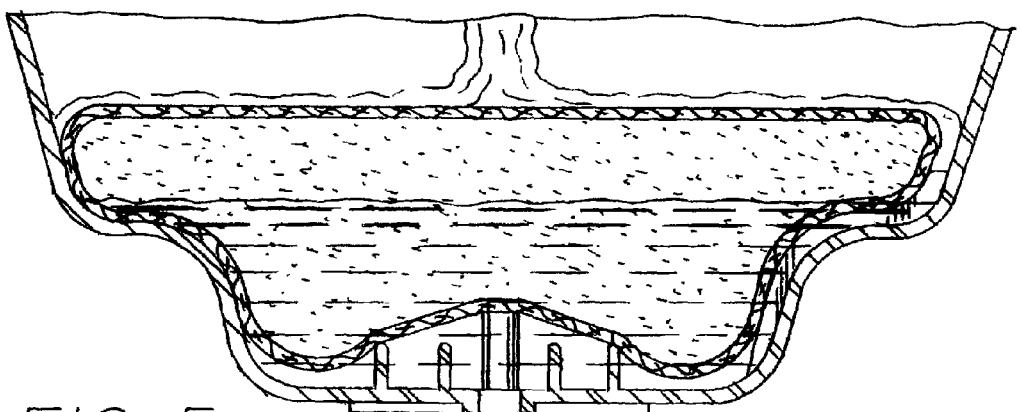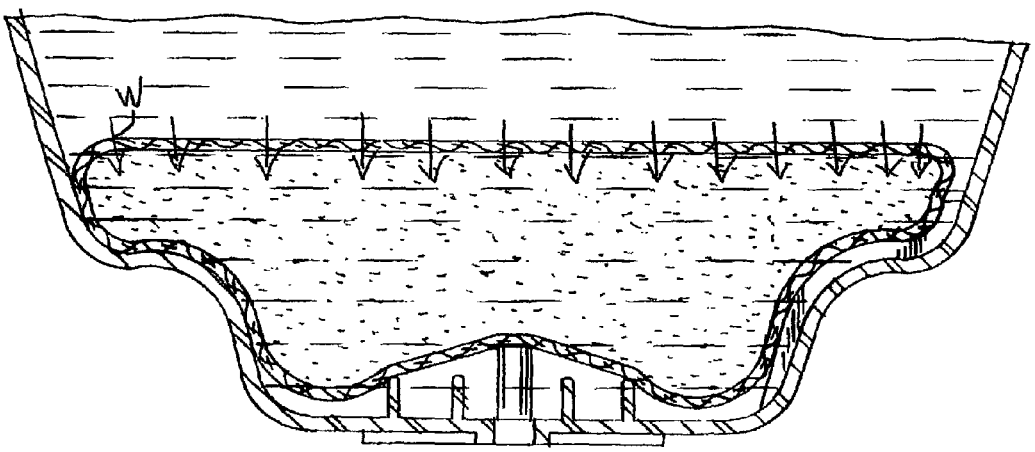

BREW BASKET FOR COFFEE FILTER PACK

BACKGROUND OF THE INVENTION

The present invention relates to coffee brewing apparatus, and more particularly to a brewing basket adapted to hold a coffee filter pack and receive infusing hot water to brew the coffee within the filter pack.

A coffee brewing apparatus typically includes a basket that is designed to retain a coffee filter holding a quantity of ground coffee. Heated water enters the basket and wets the coffee, and the water and flavored solubles removed from the coffee pass through the coffee filter to a drainage port where it exits the basket and collects below in a decanter or satellite dispenser. Some coffee brewing apparatus use baskets that are conical in shape to hold conical filters which are common in the art, while other baskets are rectangular to hold square or rectangular filter packets filled with pre-measured quantity of coffee in a sealed bag. Using pre-measured filter packets has the benefit of avoiding any measuring of coffee and is convenient for those who brew many batches of coffee in a given day, such as restaurants and coffee shops. There is no spilling of coffee granules, no scooping of coffee with measuring spoons, and disposing of the used coffee grounds is cleaner and simpler. For this reason, pre-measured coffee filter packs for dropping into a coffee brewing basket are very popular and their use is only expected to increase in the future.

Coffee filter packets are comprised essentially of a bag of pre-measured coffee made of filter material sealed about its edges. The packet is typically large enough to provide room inside the packet for the coffee to disperse and adequately wet, as opposed to a tight fit where wetting may be hindered. The excess space within the filter pack is occupied with air since the filter material is porous and air can enter and exit the filter packet. The presence of air, however, can pose a problem in that the filter packet will tend to float when the hot water is initially introduced into the basket. If the filter packet floats, the grounds inside the filter packet may not be adequately wetted, especially on the top layer of the filter packet. Further, the bottom layer of grounds may be overly exposed to the hot water causing over-brewing of these grounds and degrading the flavor of the brewed beverage. When the coffee within the filter packet is not adequately wetted, the benefit of uniform coffee flavor from packet to packet is not realized. The present invention is designed to avoid the shortcomings of the prior art and provide a brewing basket that will resist a filter pack from floating when hot water is introduced into the brewing basket and promotes complete wetting of the coffee inside the packet.

SUMMARY OF THE INVENTION

The present invention is directed to a brewing basket for a coffee brewing apparatus that is adapted to wet a coffee filter packet from below, thereby weighing down the filter pack to prevent the filter packet from floating. A structure at the bottom of the basket allows a central portion of the filter packet to sag into a pool of water where it soaks the contents of the displaced coffee. The weight added by the water causes the filter packet to rest on a supporting structure at the center of the coffee basket. The heavier filter packet promotes a sealing of the wetted filter with a sump, which leads to water being drawn vigorously through the filter packet and thus wets the contents of the filter packet. The basket has a projection or rib or other channel-creating structure on an inner side panel of a generally flat first side wall where the infusing water can bypass the filter pack and collect in a reservoir at the bottom of the basket. As water collects in the reservoir, the filter packet becomes wetted along a lower surface in contact with the collecting water, which weighs down the filter packet. Further, a sump at the bottom of the basket includes a ridge or ridges that form a seal with the filter packet and the suction created by the draining of the sump draws water into and through the filter packet. As water is pulled through the filter packet from the upper surface down through the bottom surface, the contents of the filter packet are wetted and exposed to the infusing hot water, creating a more uniform brewing process that leads to consistent and predictable results.

In a preferred embodiment, a plurality of concentric upwardly projecting ridges or walls form circular or elliptical reservoirs at the bottom of the sump. The reservoirs collect the accumulating water and pool the water to better wet the bottom of the filter packet. Small gaps at the ends of the reservoirs provide water with a path to the reservoir's interior. The sump may also preferably include a pair of upstanding posts adjacent a drainage port to prevent the filter packet from occluding the port.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 3 is a cross-sectional view of the embodiment of FIG. 1 taken along line 2—2 illustrating the direction of water flow as infusing hot water initially enters the basket;

FIG. 4 is a cross-sectional view of the embodiment of FIG. 1 taken along line 2—2 illustrating the build-up of water in the filter packet; and FIG. 5 is a cross-sectional view of the embodiment of FIG. 1 taken along line 2—2 illustrating the saturation of water throughout the filter packet.

DETAILED DESCRIPTION OF THE PREFERRED EMBODIMENTS

Figure 1:
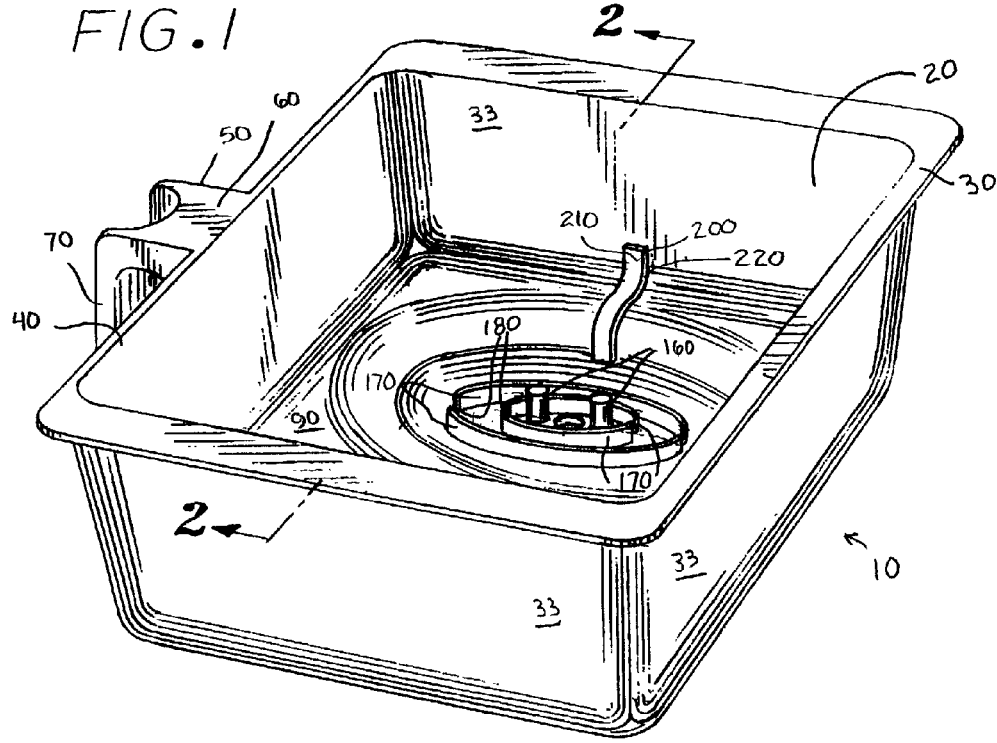
FIG. 1 is an elevated perspective view of a first preferred embodiment of the present invention.

A pre-measured and sealed coffee filter packet, when laid flat at the bottom of an ordinary coffee brewing basket, will tend to wet initially along the sides and top surfaces. As the upper surface wets, air may be trapped in the filter packet as the wetted fibers of the filter material enlarge, and the filter packet will tend to float in the absence of any mechanism to anchor the filter packet to the bottom of the basket. In the present invention, a filter basket comprises two compartments, a main compartment and a secondary compartment located below the main compartment. The secondary compartment is smaller than the main compartment and opens to the main compartment with an opening that is preferably smaller than the area of the filter packet, such that the filter packet when placed in the main compartment covers the secondary compartment. As water is introduced into the main compartment, it flows around the filter packet from the main compartment to the secondary compartment despite the filter packet covering the secondary compartment. The water bypasses the filter packet by flowing through a channel along the interior wall of the main compartment. The channel may preferably be formed by a rib that projects inwardly from an interior side wall of the main compartment and extends vertically along the contour of the side wall to the floor of the main compartment, and extends into the secondary compartment. The rib is preferably of a rectangular profile having a forward surface that is flat with side surfaces that break sharply rearward from the contact surface. The combination of the flat front surface and the side surfaces that break sharply rearward ensure that the filter packet will not completely adhere to the sides of the rib as the filter packet pushes against the rib and thus an avenue will be formed on each side of the rib to permit water to bypass the filter packet and fill the secondary compartment with infusing water. Alternatively, the channel can be formed with a recess in the side wall, such as a trough that extends vertically from the side wall to the secondary compartment where water can bypass the filter packet downward through the trough.

The secondary compartment performs as a sump and includes a drainage hole at the bottom portion. The infusing water quickly fills the secondary compartment and wets the filter packet from below, causing the filter packet to sag into the secondary compartment as water begins to enter the filter packet along a bottom surface. The wetted surface forms a seal with the elliptical ridge or ridges formed on the bottom of the secondary compartment as the weight of the filter packet increases with the accumulating water. This seal helps to draw water through the filter packet as the water inside the elliptical ridge drains through the hole creating a suction from the displaced water. Initially, water is drawn from the portions of the filter packet that are adjacent the ridges and wetted from below. As water continues to accumulate in the basket, the wetted surface of the filter packet expands and an increasing amount of water is drawn into the filter packet from a growing wetted surface area, until the entire surface area is wetted and the filter packet is completely soaked. The suction continues to hold the filter packet in place and prevents the filter packet from floating, ensuring that the contents of the filter packet will be thoroughly wetted.

FIG. 1 illustrates a first preferred embodiment of the present invention showing a brewing basket 10 for a coffee brewing apparatus. The basket 10 preferably comprises a multi-walled structure forming a polygonal compartment 20 having an open upper surface bounded by an outwardly directed brim 30. The brim 30 is typically a thin-walled member that allows the brewing basket to be supported on three sides 33 by a slotted configuration on a coffee brewing apparatus as is common in the art. The fourth side 40 has a handle 50 integrally formed thereto for manually locating and removing the basket 10 in the slotted configuration. The handle 50 may include a laterally projecting neck member 60 that integrally connects to a downwardly projecting grippable member 70 having a semi-cylindrical construction adapted for wrapping one's fingers thereabout. The walls 33, 40 of the brewing basket are typically trapezoidal in shape so that the basket narrows from the open upper surface 80 to the bottom 90 of the main compartment defined by the side walls. Each trapezoidal wall adjoins an adjacent wall in an integral relationship, and further connects with a bottom floor 90 that defines the main compartment.

Figure 2:
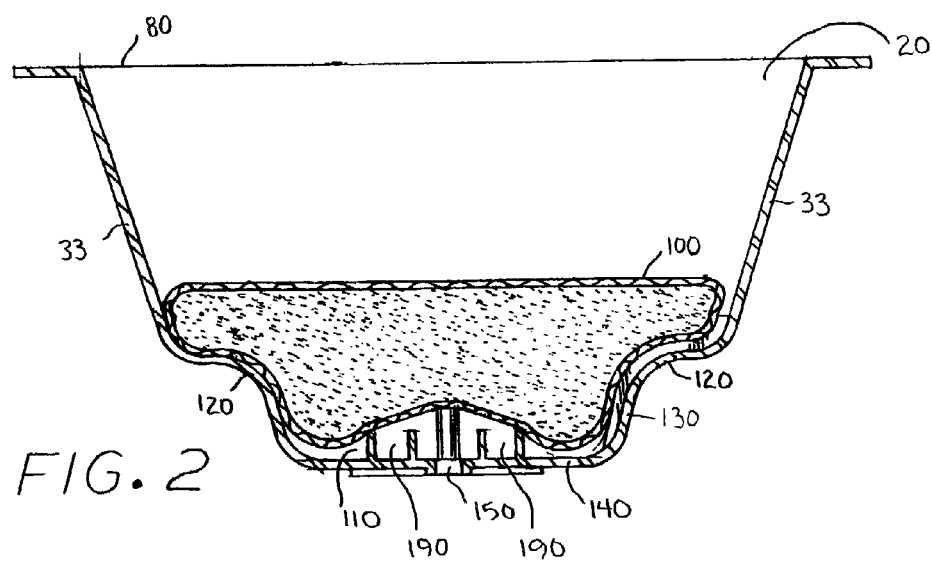
FIG. 2 is a cross-sectional view of the embodiment of FIG. 1 taken along line 2—2 with a coffee filter packet therein.

The floor 90 may be rectangular consistent with a fourwalled main compartment and is sized to receive a coffee filter packet 100 thereon (FIG. 2). Centrally disposed on the floor 90 is a recess chamber 110 defining the secondary compartment, which acts as a sump or well to collect and drain fluid. The secondary compartment has a rounded shoulder 120 at its upper edge as the floor 90 of the main compartment transitions to the recessed sump 110, the rounder shoulder 120 extending along a path defining an ellipse. A substantially vertical wall 130 below the main compartment 20 forms the sump, along with the bottom wall 140. The bottom wall 40 is preferably substantially elliptical and includes at its center a vent or drain hole 150 that allows the brewed coffee to exit the brewing basket 10. Adjacent the drain hole 150 is a pair of upstanding cylindrical posts 160 e.g., risers, spacers, or columns to protect the drain hole from being clogged or occluded by the filter packet 100 as it sags into the secondary compartment 110. The two posts 160 act like tent poles to support the middle portion of the filter packet as it descends into the sump as shown in FIG. 2.

Surrounding the drain hole 150 is a pair of elliptical ridges 170 or walls that project upwardly from the bottom 140 of the sump 110. The height of the ridges 170 are approximately one-eighth to one-quarter of an inch, and may be roughly half the height of the posts 160, that form two substantially concentric ellipses centered about the drain hole 150. Each ellipse includes at ends defined by the major axis of the ellipse a break or gap 180 defining an opening to allow liquid to enter the reservoir 190 defined by the ellipses. Water collecting at the bottom of the sump 110 will gradually reach the openings 180 of the ellipses and feed into the reservoir 190 as long as the flow rate into the basket 10 is greater than the flow rate exiting the basket through the drain hole 150.

Along the interior of the main compartment 20 on a first side wall 33 is a rib 200 integrally formed therewith and extending inward from the side wall's flat inner surface. The rib 200 has a flat contact surface 210 and side surfaces 220 that break sharply away from the flat contact surface 210 until they mate with the flat inner surface of the side wall. The rib 200 starts at an elevation above the floor 90 of the main compartment 20 and follows the contour of the basket as it extends to and along the floor 90, around the rounded shoulder 120, along the substantially vertical wall 130, and approximately to the bottom wall 140 of the secondary compartment as shown in FIGS. 1 and 2. Alternatively, the rib 200 can be replaced by a trough that allows water to bypass the filter and enter the secondary compartment without extensively wetting the upper surface of the filter packet.

In operation, the basket 10 shown generally in FIG. 1 has a filter packet 100 placed therein so that the filter packet essentially covers the opening of the sump 110. The basket is grasped by the handle 50 and placed in the brewing apparatus (not shown) at the designated slotted location. When the brewing operation is initiated, hot water 250 is introduced into the brewing basket with the filter packet 100 therein, and begins to collect around the perimeter of the filter packet. As more water enters the basket, the water reaches the location of the rib 200 where the displacement of the filter packet away from the interior wall of the brewing basket by the projecting rib provides a means for the water to bypass the filter packet and enter the secondary compartment or sump 110 (FIG. 3). Water flows down to the bottom of the sump and pools about the elliptical ridges 170 until the water 250 eventually enters the reservoir 190 through the gaps 180 at each end. While some water drains through the drain hole 150 at the center of the reservoir, the flow rate of the water entering the reservoir is larger than the flow rate out of the reservoir and the water begins to rise within the reservoir. The rising water encounters the bottom 260 of the filter packet 100 and begins to wet the filter packet from below, eventually entering into the filter packet (FIG. 4). The wetted portion of the filter packet adheres to and seals around the outer elliptical ridges 170a, such that water draining from the reservoir draws water in the filter packet through the bottom (designated by arrows "W"). More water is entrained as the water rises in the filter basket (FIG. 4) and the overall wetting of the filter packet increases until eventually the water rises above the filter packet (FIG. 5). The filter packet will then saturate with water as the entire surface of the filter packet is wetted and water is drawn throughout the filter packet. In this manner, complete saturation of the contents of the filter packet is accomplished and the brewing operation produces a more reliable and consistent process.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A basket for a coffee brewing apparatus comprising:
   a perimeter of a housing formed by at least one side wall;
   a floor member connected to the side walls at respective lower edges;
   a sunken compartment centrally disposed on the floor member defining a sump below a level of the floor member, said sump including a drain hole centrally disposed in a bottom panel;
   a channel member extending vertically from an interior surface of said at least one side wall from a position above the floor member to an interior portion of the sump;
   at least one post projecting vertically from the bottom panel of the sump and adjacent the drain hole; and
   an upstanding ridge within said sump and extending around the drain hole, the ridge cooperating with the bottom panel to form a reservoir for collecting water entering said sump at said rib.

2. The basket of claim 1 wherein the perimeter comprises four orthogonally oriented trapezoidal walls forming an inverted rectangular frusto-pyramidal compartment, and wherein said floor member comprises a rectangular bottom wall adjoining respective edges of the trapezoidal walls.

3. The basket of claim 2 wherein the sump is elliptical with its major and minor axes spanning substantially the length and width of the rectangular bottom wall.

4. The basket of claim 1 wherein the channel member comprises a rib projecting inwardly from a side wall of the main compartment to the sump.

5. The basket of claim 1 comprising a plurality of upstanding ridges wherein the upstanding ridges substantially form an ellipse defined by a pair of symmetric semi-ellipses, the semi-ellipses separated at respective ends by a gap for allowing fluid to enter and collect in a reservoir formed therebetween.

6. The basket of claim 5 further comprising first and second vertical posts disposed on opposite sides of the drain hole within the ellipse defined by the upstanding ridges.

7. The basket of claim 6 wherein the height of the first and second vertical posts is approximately twice the height of the upstanding ridges.

8. The basket of claim 1 further comprising an integral brim projecting outwardly along an upper surface of the perimeter wall, and an integral handle member extending from an outer surface of the perimeter wall.

9. A basket comprising part of a coffee brewing apparatus and adapted to retain a packet of coffee during infusion, said basket comprising:
   a first compartment defined by four rigid trapezoidal walls forming an inverted frusto-pyramidal structure and a bottom wall adjoining lower edges of the respective trapezoidal walls;
   a second compartment below the first compartment formed by a recessed elliptical portion of the bottom wall, a radial shoulder formed along a transition from the first compartment to the second compartment, and wherein said packet of coffee overlies the second compartment;
   a rib extending from said first compartment to the second compartment forming a discontinuity of the packet of coffee with the filter basket at a transition from the first compartment to the second compartment for permitting fluid entering the first compartment to bypass the packet of coffee and collect in the second compartment;
   an aperture located at a lowermost portion of the second compartment and passing through said basket;
   projection means adjacent the aperture for protecting the aperture from occlusion; and
   a plurality of upwardly projecting ridges positioned about the aperture for pooling a fluid;
   whereby the pooled fluid rises as the fluid accumulates to wet the coffee filter packet seated on the ridges, and whereby the wetted coffee filter packet forms a seal with the ridges to draw fluid through the filter packet as the pooled fluid exits through the aperture.

10. The basket of claim 9 wherein the ridges comprise spaced apart concentric ellipses centered about the aperture and wherein each ellipse includes first and second gaps at opposite ends of the ovals for passage of the fluid into the ellipses.

11. A basket for retaining a coffee filter packet while infusing liquid in introduced into the basket comprising:
   an aperture for draining the infusing liquid from the basket;
   means for collecting the infusing liquid at the bottom of said basket for wetting a lower portion of the coffee filter packet and for forming a seal with the wetted lower portion of the coffee filter packet; and
   means for passing the infusing liquid from an entry position to the means for collecting the infusion liquid bypassing the coffee filter packet.

* * * * *